United States Patent
Kwon et al.

(10) Patent No.: US 9,023,533 B2
(45) Date of Patent: May 5, 2015

(54) CABLE-TYPE SECONDARY BATTERY

(71) Applicant: LG Chem, Ltd., Seoul (KR)

(72) Inventors: Yo-Han Kwon, Daejeon (KR); Je-Young Kim, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 14/047,308

(22) Filed: Oct. 7, 2013

(65) Prior Publication Data

US 2014/0038015 A1 Feb. 6, 2014

Related U.S. Application Data (63) Continuation of application No. PCT/KR2012/006560, filed on Aug. 17, 2012.

(30) Foreign Application Priority Data

Aug. 17, 2011 (KR) .................. 10-2011-0081807
Aug. 16, 2012 (KR) .................. 10-2012-0089279

(51) Int. Cl.
*H01M 4/70* (2006.01)
*H01M 4/76* (2006.01)
(Continued)

(52) U.S. Cl.
CPC .......... *H01M 10/0422* (2013.01); *H01M 2/046* (2013.01); *H01M 2/1055* (2013.01); *H01M 2/1066* (2013.01); *H01M 2/1072* (2013.01);
(Continued)

(58) Field of Classification Search
None
See application file for complete search history.

(56) References Cited

U.S. PATENT DOCUMENTS 3,748,182 A   7/1973   Brown
4,547,439 A   10/1985  Genies
(Continued)

FOREIGN PATENT DOCUMENTS

EP   2747182 A2   6/2014
GB   136282 A    12/1919
(Continued)

OTHER PUBLICATIONS

International Search Report for Application No. PCT/KR2012/006560 dated Feb. 25, 2013.
(Continued)

*Primary Examiner* — Cynthia K. Walls
(74) *Attorney, Agent, or Firm* — Lerner, David, Littenberg, Krumholz & Mentlik, LLP (57) ABSTRACT

A cable-type secondary battery, includes an electrode assembly including first and second polarity electrodes with a thin and long shape, each having a current collector whose cross-section perpendicular to its longitudinal direction is a circular, asymmetrical oval or polygonal shape, an electrode active material applied onto the surface of the current collector, and a separator or an electrolyte layer interposed between the electrodes; and a cover member surrounding the electrode assembly, wherein the cable-type secondary battery is provided with a first polarity terminal and a second polarity terminal connected to the first polarity electrode and the second polarity electrode, respectively, at the first end of the cable-type secondary battery; a housing cap configured to fix the first and second polarity terminals and cover the first end of the cable-type secondary battery; and a length-adjustable coupling unit at a second end of the cable-type secondary battery.

19 Claims, 6 Drawing Sheets

(51) Int. Cl.
- *H01M 6/08* (2006.01)
- *H01M 2/04* (2006.01)
- *H01M 2/10* (2006.01)
- *H01M 2/26* (2006.01)
- *H01M 2/30* (2006.01)
- *H01M 4/75* (2006.01)
- *H01M 10/04* (2006.01)

(52) U.S. Cl.
CPC .............. *H01M 2/1083* (2013.01); *H01M 2/26* (2013.01); *H01M 2/30* (2013.01); *H01M 4/70* (2013.01); *H01M 4/75* (2013.01); *H01M 10/0413* (2013.01); *H01M 10/0436* (2013.01)
USPC ............ 429/238; 429/164; 429/209; 429/233

(56) References Cited

U.S. PATENT DOCUMENTS

| | | | |
|---|---|---|---|
| 6,385,041 | B1 | 5/2002 | Choi |
| 2011/0271954 | A1 | 11/2011 | Suh et al. |
| 2011/0274954 | A1 | 11/2011 | Cho et al. |

FOREIGN PATENT DOCUMENTS

| | | |
|---|---|---|
| JP | S63-86242 A | 4/1988 |
| JP | 09-007629 A | 1/1997 |
| JP | 2001-110455 A | 4/2001 |
| JP | 2001110244 A | 4/2001 |
| JP | 2003-163012 A | 6/2003 |
| JP | 2007-533098 A | 11/2007 |
| JP | 2008-166155 A | 7/2008 |
| KR | 20050099903 A | 10/2005 |
| KR | 20060000520 A | 1/2006 |
| KR | 10-0804411 | 2/2008 |
| KR | 20100077692 A | 7/2010 |
| WO | 2005098994 A1 | 10/2005 |
| WO | 2010/076975 A2 | 7/2010 |

OTHER PUBLICATIONS

International Search Report for Application PCT/KR2012/006557 dated Feb. 25, 2013.

Machine Translation of KR 1020050099903, retrieved from <http://kposd.kipo.go.kr:8088/up/kpion/> on Jul. 19, 2014.

CABLE-TYPE SECONDARY BATTERY

CROSS-REFERENCE TO RELATED APPLICATION

The present application is a continuation of International Application No. PCT/KR2012/006560 filed Aug. 17, 2012, which claims priority to Korean Patent Application No. 10-2011-0081807 filed in the Republic of Korea on Aug. 17, 2011 and Korean Patent Application No. 10-2012-0089279 filed in the Republic of Korea on Aug. 16, 2012, the disclosures of which are incorporated herein by reference.

TECHNICAL FIELD

The present invention relates to a cable-type secondary battery, and more particularly, to a terminal of the cable-type secondary battery.

BACKGROUND ART

Recently, advances in wireless communication technologies have led to the popularization of mobile devices, and to keep pace with this trend, there is a strong tendency to use secondary batteries as a power source of mobile devices. Secondary batteries are also used as a power source of environmentally friendly next-generation vehicles, such as electric vehicles and hybrid vehicles.

As described above, as the use of secondary batteries is dramatically increasing in many fields of industry, secondary batteries are varying in output, capacity, structure, and the like, depending on the characteristics of the field where the secondary batteries are used.

Generally, a secondary battery is provided with an electrode assembly including a cathode and an anode, each having a plate-like current collector surface-coated with an active material, and a separator interposed between the cathode and the anode. The electrode assembly is received in a cylindrical or prismatic metal casing or a pouch-type casing of an aluminum laminate sheet, together with a liquid electrolyte or a solid electrolyte. To improve the capacity of the secondary battery, the electrode assembly may be a jelly-roll type in which a cathode sheet, a separator sheet, and an anode sheet are rolled together, or a stack-type in which a plurality of unit electrodes of a thin plate shape are sequentially stacked. Accordingly, the electrode (cathode and anode) of the electrode assembly has a substantially plate-like structure.

The conventional plate-like electrode structure is advantageous in that it has a high degree of integration when rolling or stacking, but has difficulty in adaptively changing the structure to meet the demand of the industrial field. Furthermore, the plate-like electrode structure has various problems in that it is sensitive to the change in volume of the electrode during charging or discharging, the gas generated in the cell may not easily discharge, and the potential difference between the electrodes may increase.

Particularly, to meet the various needs of the users, the kinds of devices using secondary batteries are diversifying and a lot of emphasis is put on designing such devices. However, devices having a special shape need to offer a separate portion or space for mounting secondary batteries having a traditional structure and/or shape (cylindrical, prismatic, or pouch-type), which becomes a great obstacle to the expansion of wireless technologies and when developing new designs. For example, when a newly developed device has an elongated space for mounting a secondary battery, it is substantially impossible or very inefficient to structurally change the secondary battery including an electrode assembly made up of existing plate-like electrodes to suit the structure to the mounting space. In other words, since the conventional cylindrical, coin-type, and prismatic batteries have specific shapes, the batteries are limited in its use and ability to freely deform. Accordingly, it is difficult to adaptively deform, for example, twist or bend, the batteries depending on its use.

To solve these problems, the inventors of the present invention have disclosed Korean Patent No. 10-0804411 (filed on Jan. 17, 2006 and registered on Feb. 12, 2008) entitled "Electrode Assembly of Novel Structure and Secondary Battery Comprising the Same", all the contents of which are incorporated herein by reference.

This type of secondary battery (hereinafter, referred to as a cable-type secondary battery) is configured in a thin and long shape and have a cable structure capable of being flexible in a longitudinal direction. However, when such a cable-type secondary battery having a relatively long linear shape and excellent flexibility is used in a device, the cable-type secondary battery may be excessively deformed by the application of an external force and this causes the weakness of the coupling between the device and the cable-type secondary battery. Therefore, unlike the existing battery terminal, a battery terminal capable of strongly coupling to the device is needed for the cable-type secondary battery. Particularly, a cable-type secondary battery suitable for a device that can be worn on a human body, like a wristwatch, is needed. Accordingly, there is an increasing need for developing a cable-type secondary battery having a terminal.

DISCLOSURE

Technical Problem

The present disclosure is designed to solve the problems of the prior art, and therefore it is an object of the present disclosure to provide a cable-type secondary battery which includes a battery terminal at one end thereof and is suitable for a device that can be worn on a human body, such as a wristwatch.

Technical Solution

The present invention is designed in consideration of the problems of the prior art, and therefore it is an object of the present invention to provide a cable-type secondary battery, comprising: an electrode assembly including first and second polarity electrodes with a thin and long shape, each electrode having a current collector whose cross-section perpendicular to its longitudinal direction is a circular, asymmetrical oval or polygonal shape, and an electrode active material applied onto the surface of the current collector and a separator or an electrolyte layer interposed between the first and second polarity electrodes; and a cover member surrounding the electrode assembly, wherein the cable-type secondary battery is provided with a first polarity terminal and a second polarity terminal connected to the first polarity electrode and the second polarity electrode, respectively, at the first end of the cable-type secondary battery; a housing cap configured to fix the first and second polarity terminals and cover the first end of the cable-type secondary battery; and a length-adjustable coupling unit at a second end of the cable-type secondary battery.

The length-adjustable coupling unit may have two or more grooves or protrusions for insertion-coupling.

Preferably, the housing cap includes a coupling unit at the outside thereof. Such a coupling unit may include a spiral groove or a protrusion for insertion-coupling.

The second polarity terminal may be integrated with the housing cap.

Also, the first polarity electrode may be a cathode and the second polarity electrode may be an anode; or the first polarity electrode may be an anode and the second polarity electrode may be a cathode.

Further, it is another object of the present invention to provide a device, comprising a power mounting unit capable of mounting a cable-type secondary battery as a power source, wherein the power mounting unit includes a protruded-type coupling unit or an indented-type coupling unit configured to correspond to the coupling unit of the cable-type secondary battery.

Advantageous Effects

According to the present invention, since all electrode terminals of a cable-type secondary battery are disposed at one end thereof, the cable-type secondary battery can be easily connected to a device. Also, since a cable-type secondary battery is provided with a coupling unit, the cable-type secondary battery can be strongly coupled to a device.

In addition, since a cable-type secondary battery of the present invention includes a length-adjustable coupling unit, the cable-type secondary battery can be suitably used in a device that can be worn on a body, such as a wristwatch.

DESCRIPTION OF DRAWINGS

The accompanying drawings illustrate preferred embodiments of the present disclosure and, together with the following detailed description, serve to provide further understanding of the technical spirit of the present disclosure. However, the present disclosure is not to be construed as being limited to the drawings.

<Explanation of Reference Numerals>

10: Cable-type secondary battery
10': Secondary battery having a plurality of cable-type secondary batteries connected to each other
20: Cable-type secondary battery having a polarity terminal <Explanation of Reference Numerals>

| | |
|---|---|
| 30: Device | |
| 1: First polarity current collector | 2: Anode active material |
| 3: Separator | 4: Cathode active material |
| 5: Second polarity current collector | 6: Protection coating |
| 21: First polarity terminal | 22: Second polarity terminal |
| 11: First polarity electrode | 12: Second polarity electrode |
| 23: Housing cap | 24: Coupling unit |
| 27: Length-adjustable coupling unit | |
| 31: Indented-type of length-adjustable coupling unit | |
| 32, 35: Fixing member | |

BEST MODE

Hereinafter, the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Preferred embodiments of the present invention will be explained with reference to the accompanying drawings.

Figure 1:
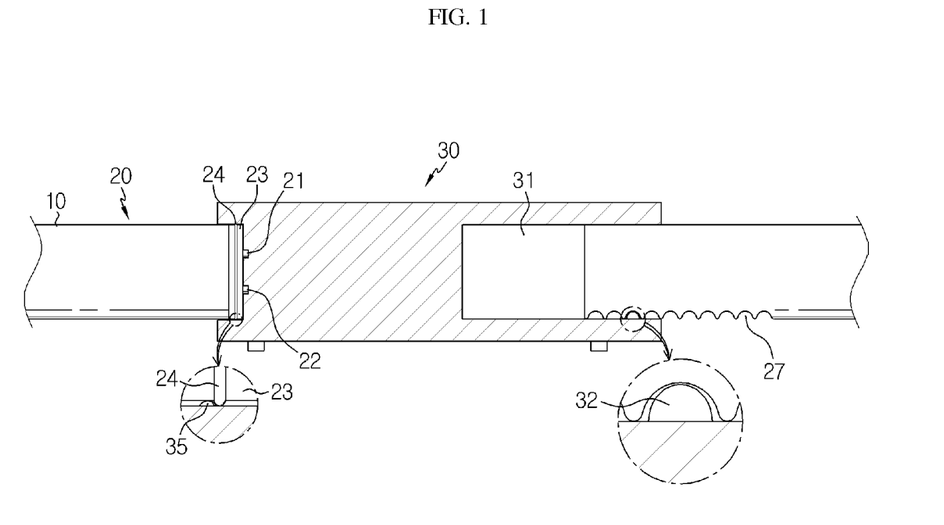
FIG. 1 is a cross-sectional view schematically showing a cable-type secondary battery including a housing cap and a length-adjustable coupling unit, and a device combined with the battery, according to a preferred embodiment of the present invention.
Figure 2:
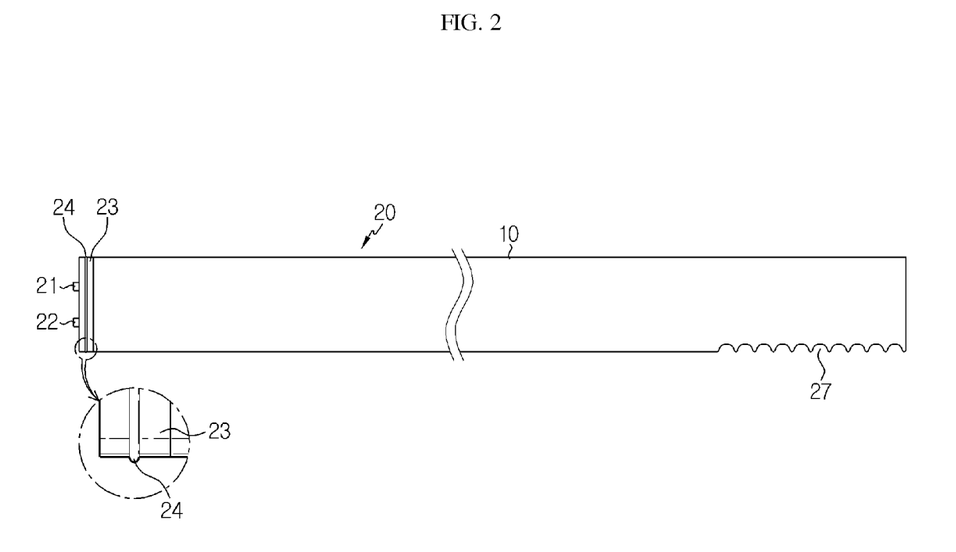
FIG. 2 is a cross-sectional view schematically showing a cable-type secondary battery including a housing cap and a length-adjustable coupling unit, in accordance with a preferred embodiment of the present invention.

FIG. 1 is a cross-sectional view schematically showing a cable-type secondary battery coupled to a device, according to a preferred embodiment of the present invention, the cable-type secondary battery having a housing cap and a length-adjustable coupling unit, and FIG. 2 is a cross-sectional view schematically showing a cable-type secondary battery having a housing cap and a length-adjustable coupling unit according to a preferred embodiment of the present invention.

Referring to FIGS. 1 and 2, the cable-type secondary battery 20 according to a preferred embodiment of the present invention includes a first polarity terminal 21 and a second polarity terminal 22 connected to the first polarity electrode 21 and the second polarity electrode 22, respectively, at the first end of the cable-type secondary battery; a housing cap 23 for fixing the first and second polarity electrodes and covering the first end of the cable-type secondary battery; and a length-adjustable coupling unit 27 at a second end of the cable-type secondary battery. The length-adjustable coupling unit 27 may have two or more grooves or protrusions for insertion-coupling. Such an insertion-coupling is carried out by applying external force when coupling is made to hold a groove or protrusion by a fixing member.

For a device that can be worn on a body, such as a wristwatch, the size of the device should be adjusted to fit each individual's body since everyone has different body sizes. Such a problem can be solved by the cable-type secondary battery using the length-adjustable coupling unit 27 according to the present invention. That is, since the coupling unit 27 has a plurality of grooves or protrusions which are sequentially formed, the coupling unit 27 may be coupled to the fixing member 32 of a device 30, at its groove or protrusion, formed in a desired position, among its plurality of groves or protrusions by way of longitudinal movement. Thereby, the length of the coupling unit 27 is adjustable.

Also, when such a cable-type secondary battery having a relatively long linear shape and excellent flexibility is used in a device, the cable-type secondary battery may be excessively deformed by the application of an external force and this causes the weakness of the coupling between the device and the cable-type secondary. Therefore, in the case of the cable-type secondary battery, unlike the existing battery terminal, a battery terminal capable of strongly coupling to the device may be required. To achieve this, the housing cap 23 of the present invention preferably has a coupling unit 24 on the outer surface thereof. The cable-type secondary battery 20 of the present invention may have the housing cap 23 including a protrusion 24 as a coupling unit for insertion-coupling.

In addition, the present invention provides a device 30 which allows the cable-type secondary battery to be connected thereto as a power source, when necessary, and has a mounting unit for mounting the cable-type secondary battery. The mounting unit includes a coupling unit 31, such as a protruded-type coupling unit or an indented-type coupling unit, which corresponds to the coupling unit of the cable-type secondary battery. Particularly, such a device 30 may have an indented-type coupling unit 31 for easy insertion-coupling to the length-adjustable coupling unit 27 and the indented-type coupling unit may be included in the device 30 as a fixing member 32. This fixing member may be pushed by a spring or the like to fix the groove or protrusion at the correct position thereof and may be configured with a hook structure capable of being decoupled by a user's pressure. Also, it will be obvious to those skilled in the art that the fixing member may include not only the above-mentioned hook structure, but also various elements required for any type of fixing which has been well-known or will be known in the future, such as latches, fasteners, fixing plates, fixing buttons, rotatable screws, radial ring, or the like.

Figure 3:
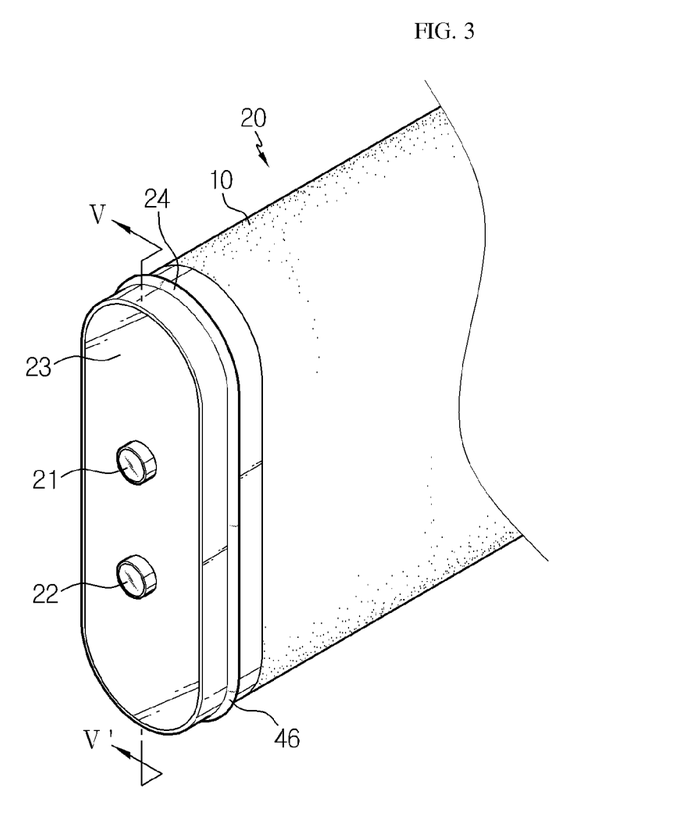
FIG. 3 is a perspective view schematically showing a cable-type secondary battery including a housing cap having a protrusion for insertion-coupling as a coupling unit, in accordance with a preferred embodiment of the present invention.
Figure 4:
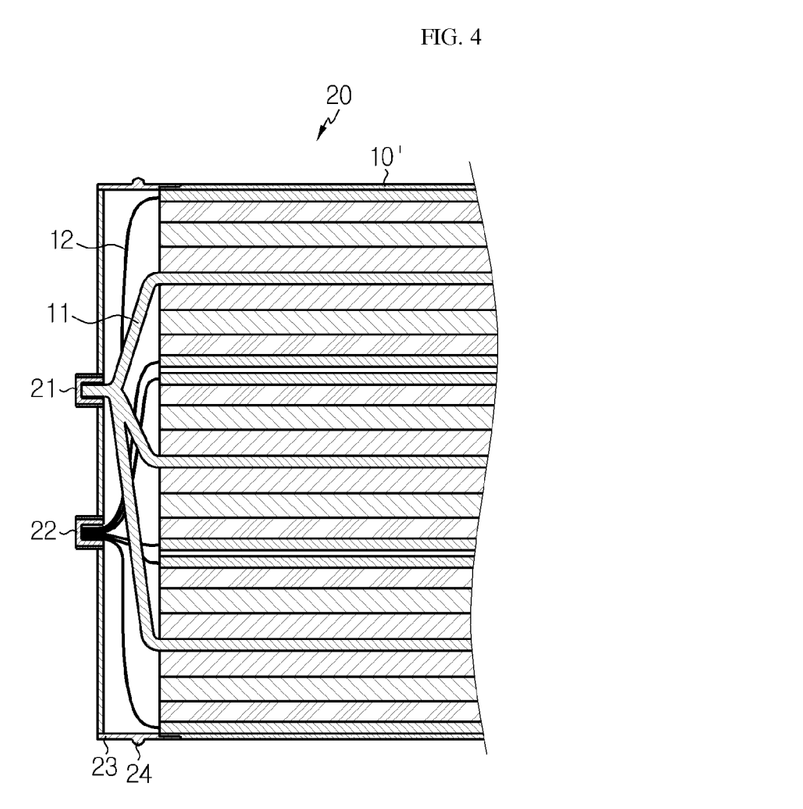
FIG. 4 is a cross-sectional view of FIG. 3.

FIG. 3 is an extracted perspective view showing the main portion of the first end of the cable-type secondary battery according to a preferred embodiment of the present invention, and FIG. 4 is a cross-sectional view of FIG. 3.

Referring to FIGS. 3 and 4, the cable-type secondary battery 20 according to another preferred embodiment of the present invention may be in the form of a sheet and have the housing cap 23 in which a protrusion 46 for insertion-coupling is formed as a coupling unit at the first end of the cable-type secondary battery. Also, the cable-type secondary battery is provided with a first polarity terminal 21 and a second polarity terminal 22 connected to the first polarity electrode 11 and the second polarity electrode 12, respectively, at the first end of the cable-type secondary battery; a housing cap 23 configured to fix the first and second polarity electrodes 21, 22 and cover the first end of the cable-type secondary battery. The electrodes may couple to the polarity electrodes 21, 22, respectively, by transforming the electrodes, or by using a connecting line. Also, through these terminals 21, 22, electric energy may be supplied to charge the cable-type secondary battery.

According to the embodiment as described above, each cable-type secondary battery 10 is provided with a thin and long shaped electrode assembly including a first polarity electrode, a second polarity electrode, and a separator interposed between the first polarity electrode and the second polarity electrode. Each of the first and second polarity electrodes is configured by applying an electrode active material onto the surface of a current collector whose cross section perpendicular to the longitudinal direction is a circular, oval (e.g., symmetric oval or asymmetric oval) or polygonal shape. The first polarity electrode is either a cathode or an anode, and the second polarity electrode is either an anode or a cathode corresponding to the first polarity electrode. Such an electrode assembly is described in Korean Patent No. 10-0804411 (filed on Jan. 17, 2006 and registered on Feb. 12, 2008) entitled "Electrode Assembly of Novel Structure and Secondary Battery Comprising the Same", all the contents of which are incorporated herein by reference.

Figure 5:
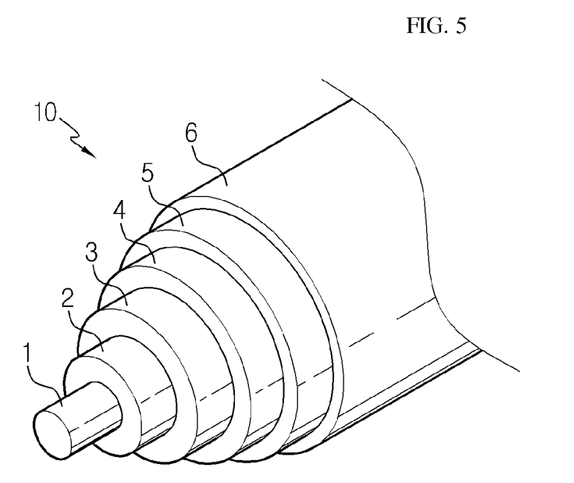
FIG. 5 is an extracted perspective view showing the main portion of a cable-type secondary battery according to a preferred embodiment of the present invention.
Figure 6:
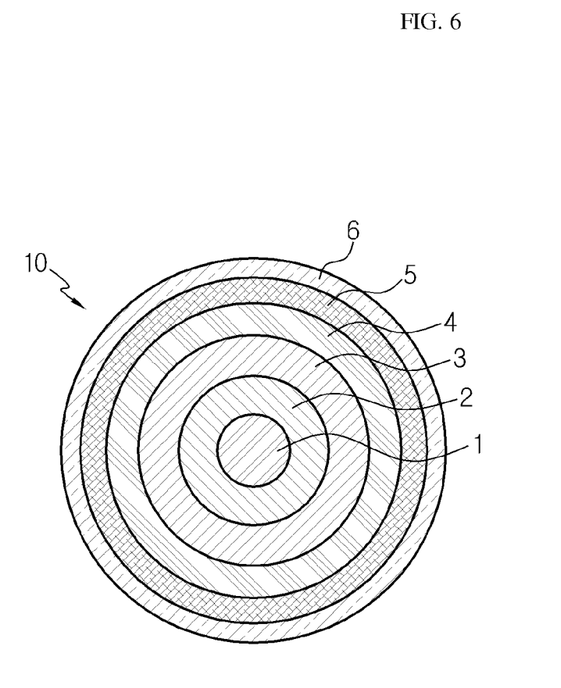
FIG. 6 is a cross-sectional view of FIG. 5.

FIG. 5 is an extracted perspective view showing the main portion of a cable-type secondary battery according to a preferred embodiment of the present invention, and FIG. 6 is a cross-sectional view of FIG. 5. The same reference numerals are regarded as indicating the elements having the same function as those of FIGS. 3 and 4.

Referring to FIGS. 5 and 6, a single strip-shaped cable-type secondary battery 10 according to a preferred embodiment of the present invention is configured with an electrode assembly, unlike the conventional plate-like electrode assembly in which an electrode active material is dispersed onto the two-dimensional current collector surface, such as a metal foil, and a protection coating 6 covering the outer surface of the electrode assembly. The electrode assembly includes a first polarity current collector 1, a three-dimensional anode current collector shaped as a thin and long wire and having a circle-shaped cross-section; an anode active material 2 provided on the surface of the first polarity current collector 1; a separating element 3 having a separator or an electrolyte and provided on the outer surface of the anode active material 2; a cathode active material 4 formed on the outer surface of the separating element 3; and a second polarity current collector 5 (i.e., a cathode current collector) provided on the outer surface of the cathode active material 4. Here, the order of the cathode and the anode may be conversed. That is, it will be understood by a person having ordinary skill in the art that the cable-type secondary battery may be configured by forming a cathode current collector having a thin and long wire shape in the center of the electrode assembly, and then forming the cathode active material, the separating element, the anode active material, and the anode current collector in order from the outside of the cathode current collector.

Meanwhile, the circle-shaped cross-section of the current collector may include a complete symmetrical circle structure and an oval structure (e.g., a symmetrical oval or an asymmetrical oval). A current collector, with the exception of a two dimensional plate shape, may have a polygonal-shaped cross-section including a triangular structure, a quadrangular structure, a pentagonal structure, a hexagonal structure, or the like and the corners of these structures may be in an angular shape or a circular shape, but is not particularly limited thereto. Also, the electrode active material is dispersed on the surface of the current collector having a circle-shaped structure or a polygonal-shaped structure, and acts to move electrons through the current collector by the intercalation/deintercalation of ions into and from an electrolyte, similar to that of the conventional secondary battery.

According to an alternative embodiment of the present invention, a multi-strip shaped cable-type secondary battery may be configured by forming an electrolyte layer in a cylindrical form around an anode bundle consisting of a plurality of anode units, in which an anode active material is applied on the anode current collector having a thin and long shape; providing a cathode active material on the outer surface of the electrolyte layer; forming a cathode current collector on the outer surface of the cathode active material; and providing a protection coating on the outer surface of the cathode current collector. Also, according to another modified embodiment of the present invention, a multi strip-shaped cable-type secondary battery may also be configured by forming a bundle of assemblies, in which an electrolyte layer is formed on the outer surface of an anode unit; forming a cathode active material layer in a cylindrical form around the bundle; forming a cathode current collector on the outer surface of the cathode active material layer; and forming a protection coating on the outer surface of the cathode current collector. According to still another modified embodiment of the present invention, a multi strip-shaped cable-type secondary battery may also be configured by forming bundles of a plurality of anode units and cathode units, in which each corresponding active material is applied on the outer surface of each wire-shaped current collector, the outer of either the anode units or the cathode units being surrounded by a first electrolyte layer; forming a second electrolyte layer in a cylindrical form around the bundle; and surrounding the second electrolyte layer with a protection coating.

Figure 7:
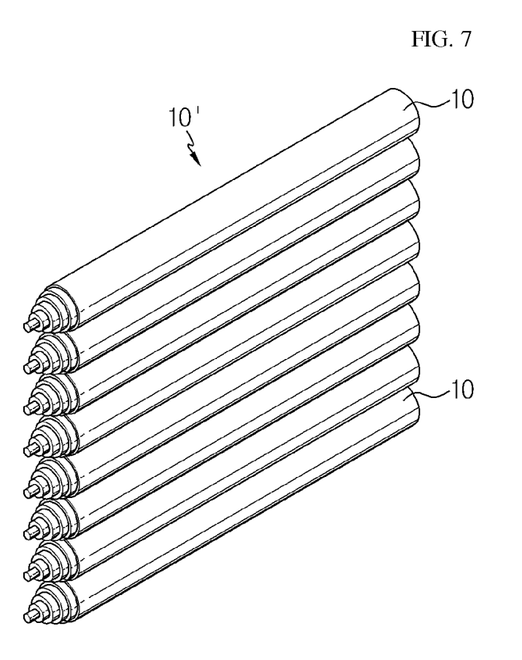
FIG. 7 is an extracted perspective view showing a cable-type secondary battery in the form of a sheet, according to a preferred embodiment of the present invention.

According to another alternative embodiment of the present invention, the cable-type secondary battery may be configured with a secondary battery 10' in which a plurality of cable-type secondary batteries are connected to each other as shown in FIG. 7 or with a single cable-type secondary battery, the cross-section of which is transformed to have a sheet shape as shown in FIG. 5. When the cable-type secondary battery 10' in which a plurality of cable-type secondary batteries are connected to each other is used, a plurality of electrodes included in the cable-type secondary battery are connected, and then, the connected electrodes are connected to a first polarity terminal 21 and a second polarity terminal 22.

Meanwhile, it should be understood that the above description and the accompanying drawings represent a preferred embodiment of the present invention and various changes and modifications, combinations and/or substitutions of the embodiments described herein can be made without departing from the scope and spirit of the invention as defined by the appended claims. Particularly, those of ordinary skill in the art should understand that, using different components, matters, ingredients, the present invention can be implemented with different specific shapes, structures, arrangements, and ratios without departing from the scope and spirit of the invention. Also, those of skilled in the art will understand that the present invention can be used after various changes and modification is made suitable for specific circumstances and operation conditions within the scope and spirit of the invention. Furthermore, the characteristics explained in the present invention can be used independently, or each characteristic of the present invention can be combined to another characteristic for the use. For example, the characteristics described in an exemplary embodiment may be inter-replaced to/from the characteristics described in another exemplary embodiment. Accordingly, the embodiments described herein are regarded as merely exemplary and are not meant to limit the present invention, and the scope of the present invention is defined by the appended claims.

The present invention has been described in detail. However, it should be understood that the detailed description and specific examples, while indicating preferred embodiments of the invention, are given by way of illustration only, since various changes and modifications within the spirit and scope of the invention will become apparent to those skilled in the art from this detailed description.

What is claimed is:

1. A cable-type secondary battery, comprising:
an electrode assembly including first and second polarity electrodes with a thin and long shape, each electrode having a current collector whose cross-section perpendicular to its longitudinal direction is a circular, asymmetrical oval or polygonal shape, and an electrode active material applied onto the surface of the current collector, and a separator or an electrolyte layer interposed between the first and second polarity electrodes; and
a cover member surrounding the electrode assembly,
wherein the cable-type secondary battery is provided with a first polarity terminal and a second polarity terminal connected to the first polarity electrode and the second polarity electrode, respectively, at a first end of the cable-type secondary battery; a housing cap configured to fix the first and second polarity terminals and cover the first end of the cable-type secondary battery; and a length-adjustable coupling unit at a second end of the cable-type secondary battery, the length-adjustable coupling unit being configured to adjust the length of a device in which the cable-type secondary battery is mounted.

2. The cable-type secondary battery according to claim 1, wherein the length-adjustable coupling unit has two or more grooves or protrusions for insertion-coupling.

3. The cable-type secondary battery according to claim 1, wherein the housing cap includes a first coupling unit at the outside thereof.

4. The cable-type secondary battery according to claim 3, wherein the first coupling unit includes a groove or a protrusion for insertion-coupling.

5. The cable-type secondary battery according to claim 1, wherein the second polarity terminal is integrated with the housing cap.

6. The cable-type secondary battery according to claim 1, wherein the first polarity electrode is a cathode and the second polarity electrode is an anode; or the first polarity electrode is an anode and the second polarity electrode is a cathode.

7. A device, comprising a power mounting unit capable of mounting the cable-type secondary battery defined in claim 1 as a power source,
wherein the power mounting unit includes a protruded-type coupling unit or an indented-type coupling unit configured to correspond to the length-adjustable coupling unit of the cable-type secondary battery.

8. The cable-type secondary battery according to claim 1, wherein the length-adjustable coupling unit includes a plurality of fixing locations along its length, each of the fixing locations being configured to fixedly engage a second coupling unit of a device.

9. The cable-type battery according to claim 8, wherein each of the fixing locations is defined by a groove.

10. The cable-type battery according to claim 9, wherein each of the grooves are configured to receive a protruding fixing member of the second coupling unit.

11. A cable-type secondary battery, comprising:
an electrode assembly including first and second polarity electrodes with a thin and long shape, each electrode having a current collector whose cross-section perpendicular to its longitudinal direction is a circular, asymmetrical oval or polygonal shape, and an electrode active material applied onto the surface of the current collector, and a separator or an electrolyte layer interposed between the first and second polarity electrodes; and
a cover member surrounding the electrode assembly,
wherein the cable-type secondary battery is provided with a first polarity terminal and a second polarity terminal connected to the first polarity electrode and the second polarity electrode, respectively, at a first end of the cable-type secondary battery; a housing cap configured to fix the first and second polarity terminals and cover the first end of the cable-type secondary battery; and an adjustable coupling unit at a second end of the cable-type secondary battery, the adjustable coupling unit being configured to fixedly couple with a second coupling unit of a device at a plurality of fixing locations along the length of the adjustable coupling unit.

12. The cable-type secondary battery according to claim 11, wherein the adjustable coupling unit has two or more grooves or protrusions for insertion-coupling.

13. The cable-type secondary battery according to claim 11, wherein the housing cap includes a first coupling unit at the outside thereof.

14. The cable-type secondary battery according to claim 13, wherein the first coupling unit includes a groove or a protrusion for insertion-coupling.

15. The cable-type secondary battery according to claim 11, wherein the second polarity terminal is integrated with the housing cap.

16. The cable-type secondary battery according to claim 11, wherein the first polarity electrode is a cathode and the second polarity electrode is an anode; or the first polarity electrode is an anode and the second polarity electrode is a cathode.

17. A device, comprising a power mounting unit capable of mounting the cable-type secondary battery defined in claim 11 as a power source,
    wherein the power mounting unit includes a protruded-type coupling unit or an indented-type coupling unit configured to correspond to the adjustable coupling unit of the cable-type secondary battery.

18. The cable-type battery according to claim 11, wherein each of the fixing locations is defined by a groove.

19. The cable-type battery according to claim 18, wherein each of the grooves are configured to receive a protruding fixing member of the second coupling unit.

* * * * *